(12) United States Patent
Brookes (10) Patent No.: US 12,070,980 B2
(45) Date of Patent: Aug. 27, 2024

(54) COMMUNICATION MODULES AS WELL AS GAS SPRING ASSEMBLIES AND VEHICLE SYSTEMS INCLUDING SAME

(71) Applicant: FIRESTONE INDUSTRIAL PRODUCTS COMPANY, LLC, Nashville, TN (US)

(72) Inventor: Graham R. Brookes, Noblesville, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 648 days.

(21) Appl. No.: 17/270,992

(22) PCT Filed: Sep. 4, 2019

(86) PCT No.: PCT/US2019/049450
§ 371 (c)(1),
(2) Date: Feb. 24, 2021

(87) PCT Pub. No.: WO2020/055637
PCT Pub. Date: Mar. 19, 2020

(65) Prior Publication Data
US 2021/0323369 A1 Oct. 21, 2021

Related U.S. Application Data

(60) Provisional application No. 62/730,836, filed on Sep. 13, 2018.

(51) Int. Cl.
| | |
|---|---|
| B60G 17/015 | (2006.01) |
| B60C 19/00 | (2006.01) |
| B60G 17/019 | (2006.01) |
| B60G 17/052 | (2006.01) |
| F16F 9/05 | (2006.01) |
| F16F 9/32 | (2006.01) |
| G08C 17/02 | (2006.01) |
| H02J 50/00 | (2016.01) |

(52) U.S. Cl.
CPC .......... *B60G 17/0155* (2013.01); *B60C 19/00* (2013.01); *B60G 17/01908* (2013.01);
(Continued)

(58) Field of Classification Search
CPC .......... B60G 17/0155; B60G 17/01908; B60G 17/0521; B60G 2202/152;
(Continued)

(56) References Cited

U.S. PATENT DOCUMENTS

| 5,707,045 A * | 1/1998 | Easter | F16F 9/05 |
| | | | 188/1.11 E |
| 2007/0171036 A1* | 7/2007 | Nordmeyer | G01S 13/825 |
| | | | 340/539.1 |

(Continued)

OTHER PUBLICATIONS

International Search Report and Written Opinion for corresponding PCT Application No. PCT/US2019/049450 dated Nov. 15, 2019.

*Primary Examiner* — Toan C To
(74) *Attorney, Agent, or Firm* — Thomas R. Kingsbury; Matthew P. Dugan (57) ABSTRACT

A communication and power transmission module includes a communication connection portion adapted for communicative coupling with an associated controller. A wireless power and communication portion is adapted for communicative coupling with an associated sensing device operatively associated with an associated suspension component and/or an associated wheel. The wireless power and communication portion is operable to communicate wireless data and/or signals to and/or from the associated sensing device and operable to wirelessly transmit power to the associated sensing device. Gas spring assemblies and vehicles including one or more of such communication and power transmission modules are also included.

20 Claims, 6 Drawing Sheets

(52) U.S. Cl.
CPC ............ *B60G 17/0521* (2013.01); *F16F 9/05* (2013.01); *F16F 9/3292* (2013.01); *G08C 17/02* (2013.01); *B60C 2019/004* (2013.01); *B60G 2202/152* (2013.01); *B60G 2400/102* (2013.01); *B60G 2400/252* (2013.01); *B60G 2400/51222* (2013.01); *B60G 2400/7122* (2013.01); *B60G 2600/71* (2013.01); *F16F 2222/126* (2013.01); *F16F 2230/08* (2013.01); *F16F 2230/18* (2013.01); *F16F 2232/08* (2013.01); *H02J 50/00* (2016.02)

(58) Field of Classification Search
CPC ........ B60G 2400/102; B60G 2400/252; B60G 2400/51222; B60G 2400/7122; B60G 2600/71; B60C 19/00; B60C 2019/004; F16F 9/05; F16F 9/3292; F16F 2222/126; F16F 2230/08; F16F 2230/18; F16F 2232/08; G08C 17/02; H02J 50/00

See application file for complete search history.

(56) References Cited

U.S. PATENT DOCUMENTS

| | | | |
|---|---|---|---|
| 2007/0257833 A1* | 11/2007 | Nordmeyer | G01S 13/758 340/686.2 |
| 2009/0277262 A1 | 11/2009 | Rensel et al. | |
| 2010/0320703 A1* | 12/2010 | Lin | B60G 17/018 280/5.507 |
| 2011/0083500 A1* | 4/2011 | Rensel | B60G 17/019 73/117.03 |
| 2012/0291537 A1 | 11/2012 | Honda et al. | |
| 2014/0117598 A1* | 5/2014 | May | B60G 17/019 267/64.27 |
| 2014/0145411 A1* | 5/2014 | May | F16F 9/3292 280/124.157 |
| 2014/0306388 A1* | 10/2014 | May | F16F 9/3292 267/64.27 |
| 2015/0224845 A1* | 8/2015 | Anderson | B60G 17/019 701/37 |
| 2017/0225535 A1* | 8/2017 | Batsch | B60G 17/0195 |
| 2018/0339566 A1* | 11/2018 | Ericksen | B60G 17/08 |
| 2019/0111751 A1* | 4/2019 | Lockridge | B60G 11/27 |
| 2020/0094645 A1* | 3/2020 | Edren | B60G 17/0525 |
| 2020/0238782 A1* | 7/2020 | Vaughan | F15B 1/08 |
| 2020/0363274 A1* | 11/2020 | Scott | G01G 19/10 |
| 2021/0039469 A1* | 2/2021 | Vaughan | B60G 17/0525 |
| 2022/0134830 A1* | 5/2022 | Voelkel | B60G 17/0152 188/313 |
| 2023/0150329 A1* | 5/2023 | Coombs | F15B 13/0814 280/124.16 |
| 2023/0150333 A1* | 5/2023 | Hirani | B60G 17/06 701/37 |
| 2023/0182509 A1* | 6/2023 | Prabhakara | G06V 20/64 73/146 |

* cited by examiner

COMMUNICATION MODULES AS WELL AS GAS SPRING ASSEMBLIES AND VEHICLE SYSTEMS INCLUDING SAME

This application is the National Stage of International Application No. PCT/US2019/049450, filed on Sep. 4, 2019, which claims the benefit of priority from U.S. Provisional Patent Application No. 62/730,836, filed on Sep. 13, 2018, the subject matter of which is hereby incorporated herein by reference in its entirety.

BACKGROUND

The present disclosure broadly relates to the art of communication modules operatively associated with suspension systems and/or wheel assemblies of vehicles. The present disclosure includes gas spring devices, systems and methods including such communication modules.

The subject matter of the present disclosure finds particular application and use in conjunction with components for wheeled vehicles, and will be shown and described herein with reference thereto. However, it is to be appreciated that the subject matter of the present disclosure is also amenable to use in other applications and environments, and that the specific uses shown and described herein are merely exemplary.

Wheeled motor vehicles of most types and kinds include a sprung mass, such as a body or chassis, for example, and an unsprung mass, such as two or more wheels and two or more axles or other wheel-engaging members, for example, with a suspension system disposed between the sprung and unsprung masses. Typically, a suspension system will include a plurality of spring devices as well as a plurality of damping devices that together permit the sprung and unsprung masses of the vehicle to move in a somewhat controlled manner relative to one another. Generally, the plurality of spring elements function to accommodate forces and loads associated with the operation and use of the vehicle, and the plurality of damping devices are operative to dissipate undesired inputs and movements of the vehicle, particularly during dynamic operation thereof. Movement of the sprung and unsprung masses toward one another is normally referred to in the art as jounce motion while movement of the sprung and unsprung masses away from one another is commonly referred to in the art as rebound motion.

As vehicle manufacturers strive to develop vehicles providing greater ride comfort as well as improved vehicle performance, the various major mechanical systems of such vehicles have become increasingly electronically controlled and are now often quite complex. Such major mechanical systems can include suspensions systems having active damping and/or active roll control, braking systems that provide anti-lock braking and traction control, stability control systems that often include aspects of one or more of the foregoing as well as other systems. Tire pressure monitoring systems and tire inflation systems are also commonly available on vehicles that include pneumatic tires.

As the foregoing and other vehicle systems have become increasingly complex, a number of challenges have developed. One example of such a challenge involves the attendant increase in the number of sensors and other components, as well as the corresponding increase in wires and/or connectors needed to communicate information and data to and from these devices. Direct or "hard" wiring such a multitude of sensors exacerbates or otherwise undesirably influences the existing challenges already associated with assembly and/or installation, such as may be associated with finding areas for such sensors and the attendant electrical conductors to be located. Additionally, the direct wiring of such a multitude of sensors can lead to an increase in cost of materials and/or in vehicle weight due to the inclusion of a multitude of individual conductors.

Notwithstanding the overall success of known vehicle systems, the foregoing and/or other challenges remain and may continue to develop as additional complexities are introduced into vehicles and systems thereof. Accordingly, it is believed desirable to develop communication modules as well as gas spring devices, suspension systems and methods may aid in overcoming the foregoing and/or other challenges associated with known designs, and/or otherwise advance the art of vehicles and vehicle systems.

BRIEF SUMMARY

One example of a communication and power transmission module in accordance with the subject matter of the present disclosure can be dimensioned for securement adjacent an associated suspension component and/or an associated wheel of an associated vehicle. The communication and power transmission module can include a communication connection portion adapted for communicative coupling with an associated controller. The module can also include a wireless power and communication portion that is adapted for communicative coupling with an associated sensing device that is operatively associated with the associated suspension component and/or the associated wheel. The wireless power and communication portion can be operable to communicate wireless data and/or signals to and/or from the associated sensing device and operable to wirelessly transmit power to the associated sensing device.

In some cases, the associated sensing device can be a first associated sensing device that is operatively associated with the associated tire, and a communication and power transmission module according to the foregoing paragraph can also include a sensor connection portion that is adapted for communicative coupling with a second associated sensing device that is operatively associated with the associated suspension component. The sensor connection portion can be communicatively coupled with the communication connection portion. In some cases, the second associated sensing device can be operable to sense height, distance, pressure, temperature and/or acceleration properties having a relation to the associated suspension component, which can be an associated gas spring assembly, as a non-limiting example.

One example of a gas spring assembly in accordance with the subject matter of the present disclosure can be dimensioned for securement to an associated vehicle component adjacent an associated wheel that includes an associated sensing device operatively associated therewith. The gas spring assembly can include a flexible spring member having a longitudinal axis. The flexible spring member can extend lengthwise between opposing first and second ends and peripherally about the longitudinal axis to at least partially define a spring chamber. A first end member can be secured across the first end of the flexible spring member such that a substantially fluid-tight seal is formed therebetween. A second end member can be secured across the second end of the flexible spring member such that a substantially fluid-tight seal is formed therebetween. A gas spring sensing device can be adapted to communicate outputs having a relation to a property of the gas spring assembly. A communication and power transmission module can be supported on or along the first and/or second end members. The communication and power transmission module can include a communication connection portion adapted for communicative coupling with an associated controller of the associated vehicle. A sensor connection portion can be communicatively coupled with the gas spring sensing device. A wireless power and communication portion can be adapted for communicative coupling with the associated sensing device of the associated wheel. The wireless power and communication portion can be operable to communicate wireless data and/or signals to and/or from the associated sensing device of the associated wheel and operable to wirelessly transmit power to the associated sensing device of the associated wheel.

One example of a vehicle in accordance with the subject matter of the present disclosure can include a sensing device operatively associated with an associated wheel and operable to communicate outputs having a relation to a property of the associated wheel. A communication and power transmission module can be disposed adjacent the associated wheel. The communication and power transmission module can include a communication connection portion adapted for communicative coupling with an associated controller. A wireless power and communication portion can be adapted for communicative coupling with the sensing device. The wireless power and communication portion can be operable to communicate wireless data and/or signals to and/or from the sensing device and operable to wirelessly transmit power to the sensing device.

In some cases, a vehicle in accordance with the foregoing paragraph can include a sensing device operatively associated with a vehicle component and/or a suspension component. The sensing device can be communicatively coupled with the communication connection portion of the communication and power transmission module and operative to communicate outputs having a relation to distance, temperature, pressure and/or acceleration.

In some cases, a vehicle in accordance with either of the foregoing two paragraphs can include a gas spring assembly supported adjacent the associated wheel. The gas spring assembly can have a longitudinal axis and can include a flexible spring member that extends lengthwise between opposing first and second ends and peripherally about the longitudinal axis to at least partially define a spring chamber. A first end member can be secured across the first end of the flexible spring member such that a substantially fluid-tight seal is formed therebetween. A second end member can be secured across the second end of the flexible spring member such that a substantially fluid-tight seal is formed therebetween. In some cases, the communication and power transmission module can be at least partially supported on the first and/or second end members.

DETAILED DESCRIPTION

Turning now to the drawings, it is to be understood that the showings are for purposes of illustrating examples of the subject matter of the present disclosure and that the drawings are not intended to be limiting. Additionally, it will be appreciated that the drawings are not to scale and that portions of certain features and/or elements may be exaggerated for purposes of clarity and/or ease of understanding.

Figure 1:
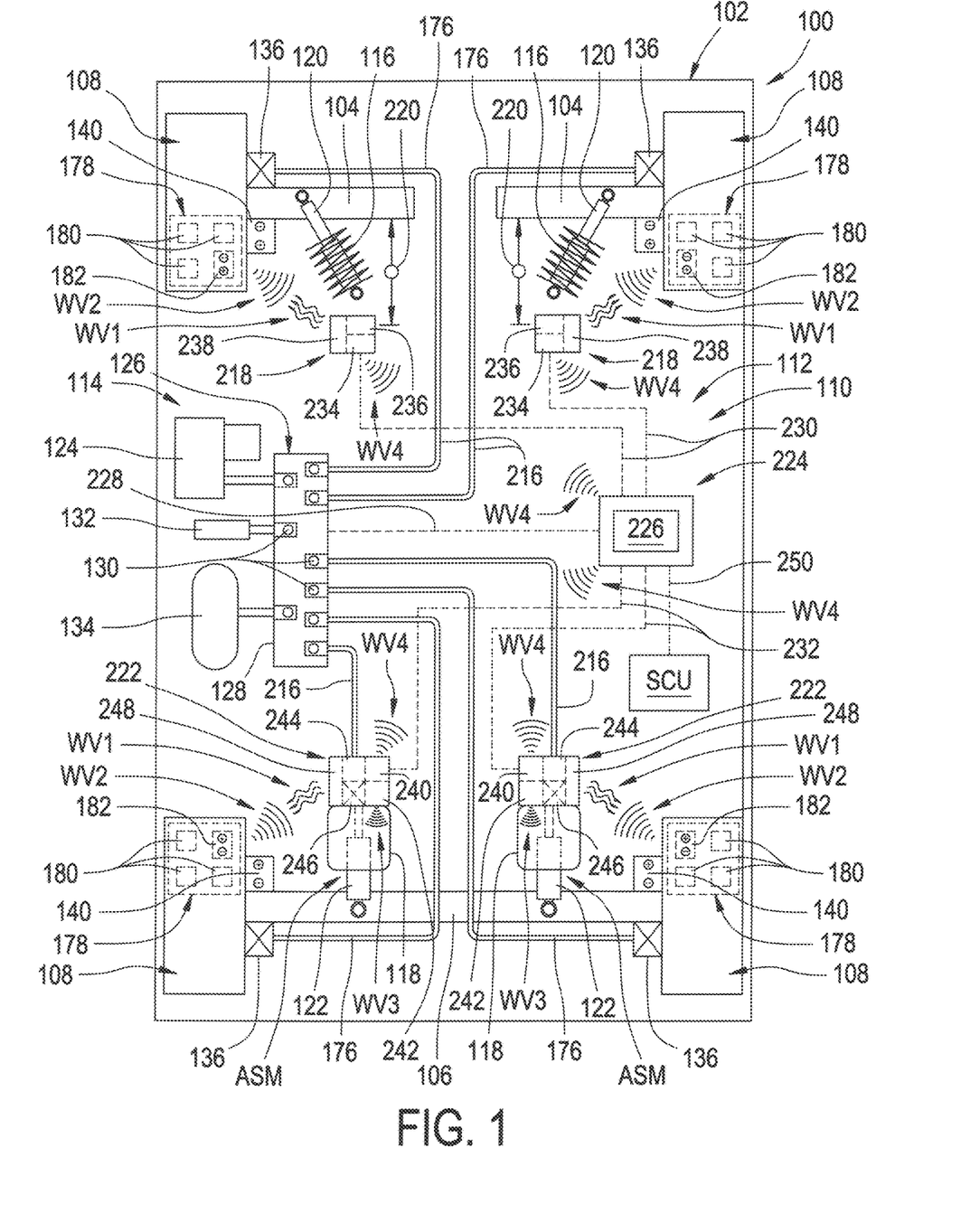
FIG. 1 is a schematic representation of one example of a vehicle including a suspension system in accordance with the subject matter of the present disclosure.

FIG. 1 illustrates one example of a vehicle 100 that includes a sprung mass, such as a vehicle body 102, for example, and an unsprung mass, such as suspension components 104 and/or 106, for example. Additionally, a plurality of wheel assemblies 108 are supported on or along suspension components 104 and/or 106 in a conventional manner. Vehicle 100 can also include a suspension system 110 operatively disposed between the sprung and unsprung masses (e.g., vehicle body 102 and one or more of suspension components 104 and/or 106). Vehicle 100 can further include a communication system 112 that is communicatively coupled or otherwise operatively associated with one or more areas, regions and/or zones of vehicle 100 and one or more systems, assemblies and/or components disposed in or near such one or more areas, regions and/or zones. In some cases, communication system 112 can include or can be otherwise operatively associated with tire pressure monitoring functionality, such as may be similar to conventional tire pressure monitoring systems, for example. And, in some cases, communication system 112 can include or can be otherwise operatively associated with tire inflation functionality, such as may be similar to conventional tire inflation systems, for example. Furthermore, communication system 112 can include or can be otherwise operatively associated with suspension operation and/or control functionality, such as may be similar to conventional height adjusting operations, active or semi-active damping systems, and the like.

In many cases, wheel assemblies 108 of vehicle 100 will include one or more tires. In some cases, the tires can be of a type and/or kind commonly referred to as solid or other non-pneumatic tires. In other cases, the tires can be of a type and/or kind that utilize a quantity of pressurized gas as an operating medium and are commonly referred to as pneumatic tires. Additionally, or in the alternative, suspension system 110 can include one or more spring and/or damping devices. In some cases, the suspension system can include one or more gas spring devices, such as gas spring assemblies and/or gas spring and damper assemblies, for example. As such, vehicle 100 can also include a pressurized gas system 114 that can be operatively connected in fluid communication with any one or more gas spring devices, such as may be included in suspension system 110, and/or any one or more wheel assemblies 108.

It will be appreciated that suspension system 110 can include any combination spring and damper devices operatively disposed between the sprung and unsprung masses of the associated vehicle. That is, suspension system 110 can include any combination of one or more non-fluid springs (e.g., leaf springs, coil springs, torsion springs) and/or gas spring devices operatively connected between the sprung and unsprung masses of the associated vehicle. Typically, one or more dampers (e.g., conventional shock absorbers, conventional struts, force-adjustable and/or rate-adjustable damping devices, and/or pressurized gas damping devices) can, optionally, be operatively connected between the sprung and unsprung masses. In some cases, the one or more dampers can be provided as separate components and secured between the sprung and unsprung masses independent from the one or more spring devices. In other cases, the one or more dampers can, optionally, be secured between the sprung and unsprung masses in conjunction (e.g., axially co-extensive) with the one or more spring devices, such as are shown in FIG. 1, for example.

In the arrangement shown in FIG. 1, suspension system 110 includes four spring devices with one spring device disposed toward each corner of vehicle 100 adjacent a corresponding one of wheel assemblies 108. It will be appreciated, however, that any other suitable number of spring devices could alternately be used in any other configuration and/or arrangement. Additionally, it will be recognized that spring devices shown and described herein are merely exemplary and that spring devices of any other suitable types, kinds and/or constructions could alternately be used without departing from the subject matter of the present disclosure.

As shown in FIG. 1, suspension system 110 includes two non-fluid spring devices 116 that are shown as being disposed in operative association between vehicle body 102 and suspension components 104 as well as two gas spring assemblies 118 that are shown as being disposed in operative association between vehicle body 102 and suspension component 106. Though non-fluid spring devices 116 and gas spring assemblies 118 are shown as being operatively connected in an axially-coextensive arrangement with dampers (or damper assemblies) 120 and 122, respectively, it will be appreciated that other configurations and/or constructions could alternately be used, such as by mounting any one of more of the spring devices and the dampers separately from one another, for example. In some cases, constructions that include a gas spring and a damper operatively connected to one another in an axially-coextensive arrangement may be referred to herein as gas spring and damper assemblies, such as is represented by gas spring and damper assemblies ASM in FIGS. 1 and 3, for example.

Pressurized gas system 114 can be operatively associated with any one or more of wheel assemblies 108, gas spring assemblies 118 and/or other components and systems that consume, generate or otherwise fluidically communicate with pressurized gas (e.g., pressurized air). In such cases, pressurized gas system 114 can be utilized to selectively supply pressurized gas to and/or selectively transfer pressurized gas from any one or more of such assemblies, components and/or systems. In the exemplary arrangement shown in FIG. 1, pressurized gas system 114 includes a pressurized gas source, such as a compressor 124, for example, for generating pressurized air or other gases. A control device, such as a valve assembly 126, for example, is shown as being in communication with compressor 124 and can be of any suitable configuration or arrangement. In the exemplary embodiment shown, valve assembly 126 includes a valve block 128 with a plurality of valves 130 supported thereon. Valve assembly 126 can also, optionally, include a suitable exhaust, such as a muffler 132, for example, for venting pressurized gas from the system.

Optionally, pressurized gas system 114 can also include a reservoir 134 in fluid communication with the compressor and/or valve assembly 126 and suitable for storing pressurized gas for an extended duration (e.g., minutes, hour, days, months).

As discussed above, vehicle 100 can include communication system 112 that can include or can be otherwise operatively associated with any suitable combination of elements, components, devices, assemblies and/or systems operative to provide one or more functions and/or operations, such as tire pressure monitoring system functionality (e.g., capability to communicate to systems and/or vehicle operators one or more physical conditions of a tire, such as tire pressure and/or temperature, for example), tire inflation system functionality (e.g., capability to transfer pressurized gas into and/or out of a pneumatic tire chamber) and/or suspension operation and/or control functionality (e.g., capability to transfer pressurized gas into and/or out of gas spring devices and/or capability to alter performance characteristics of gas spring devices and/or damping devices).

Communication system 112 can, optionally, include one or more control devices 136 (e.g., valves) that are operatively associated with a tire chamber 138 (FIG. 3) of wheel assemblies 108. Control devices 136 can be operated to selectively transfer pressurized gas into and/or out of the tire chamber of the wheel assemblies. In some cases, control devices 136 can be operated using electrical power and/or communication signals transferred to/from or otherwise exchanged with the control devices by way of wireless communications and/or wireless power transmission, such as is represented in FIG. 1 by waves WV1 and WV2. Additionally, or in the alternative, control devices 136 could be communicatively coupled with local electrical power sources, such as may be disposed adjacent each of wheel assemblies 108. As a non-limiting example, a rechargeable electrical power source 140, such as a battery, for example, could be communicatively coupled or otherwise operatively associated with control devices 136.

As identified in FIGS. 1-4, wheel assemblies 108 can include a tire 142 installed on a wheel or rim 144. In some cases, tire 142 can be a pneumatic tire mounted on wheel 144 in a conventional manner permitting operation and use of the tire in an inflated condition. As indicated above, however, it will be recognized and appreciated that any other suitable types, kinds and/or constructions of tires (e.g., non-pneumatic tires) and/or wheels could alternately be used without departing from the subject matter of the present disclosure. Wheel 144, which can be of any suitable type, kind, construction and/or configuration, is shown as including a mounting hub 146 having a plurality of mounting holes 148 in a suitable hole pattern. Wheel 144 is also shown as including opposing rim walls 150 and 152 (FIG. 3) that terminate at corresponding side walls or flanges 154 and 156 with bead seats (not numbered) formed along the rim walls adjacent the respective flanges.

Figure 2:
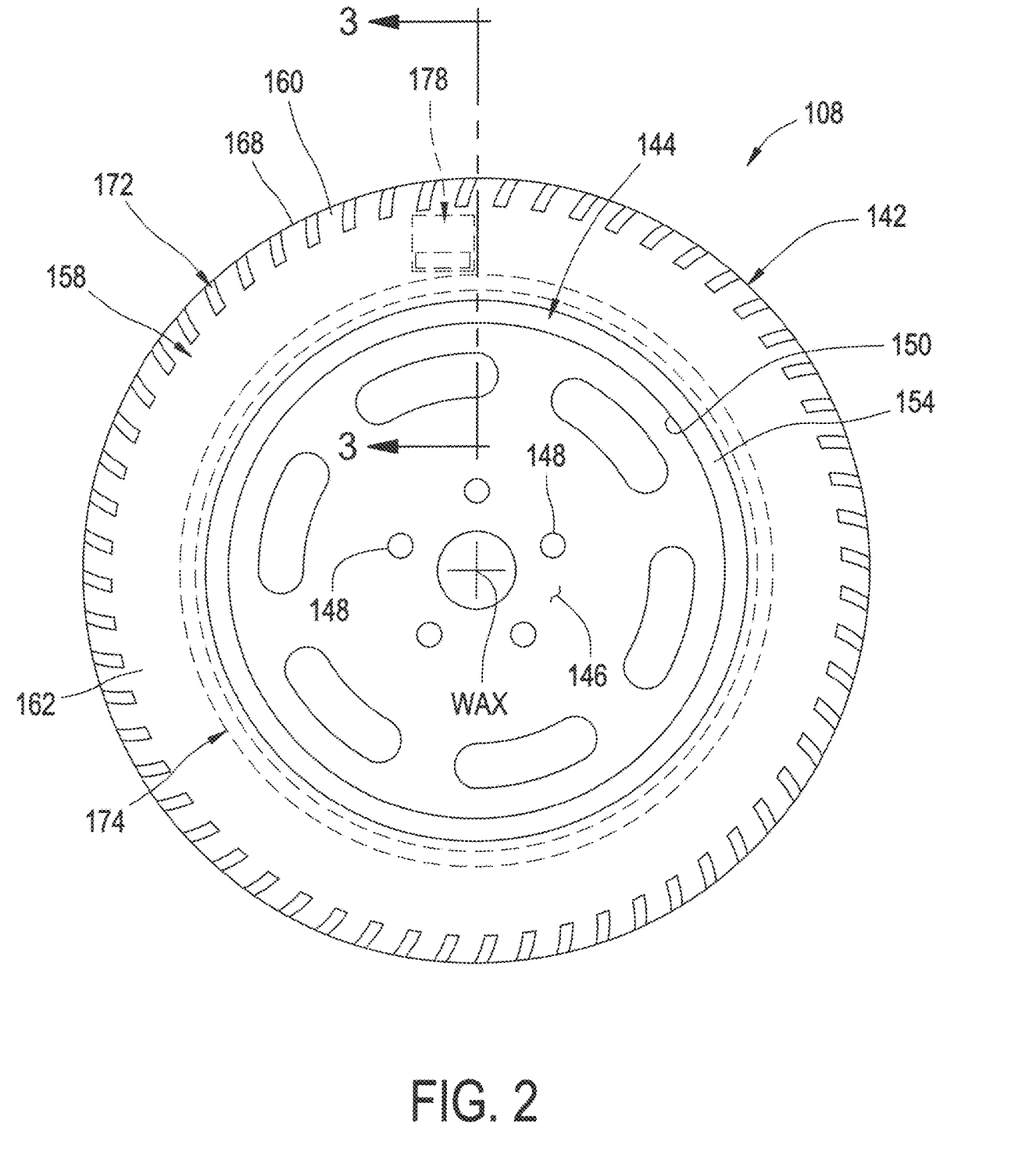
FIG. 2 is a front elevation view of one example of a tire including a communication and power transfer component in accordance with the subject matter of the present disclosure.
Figure 3:
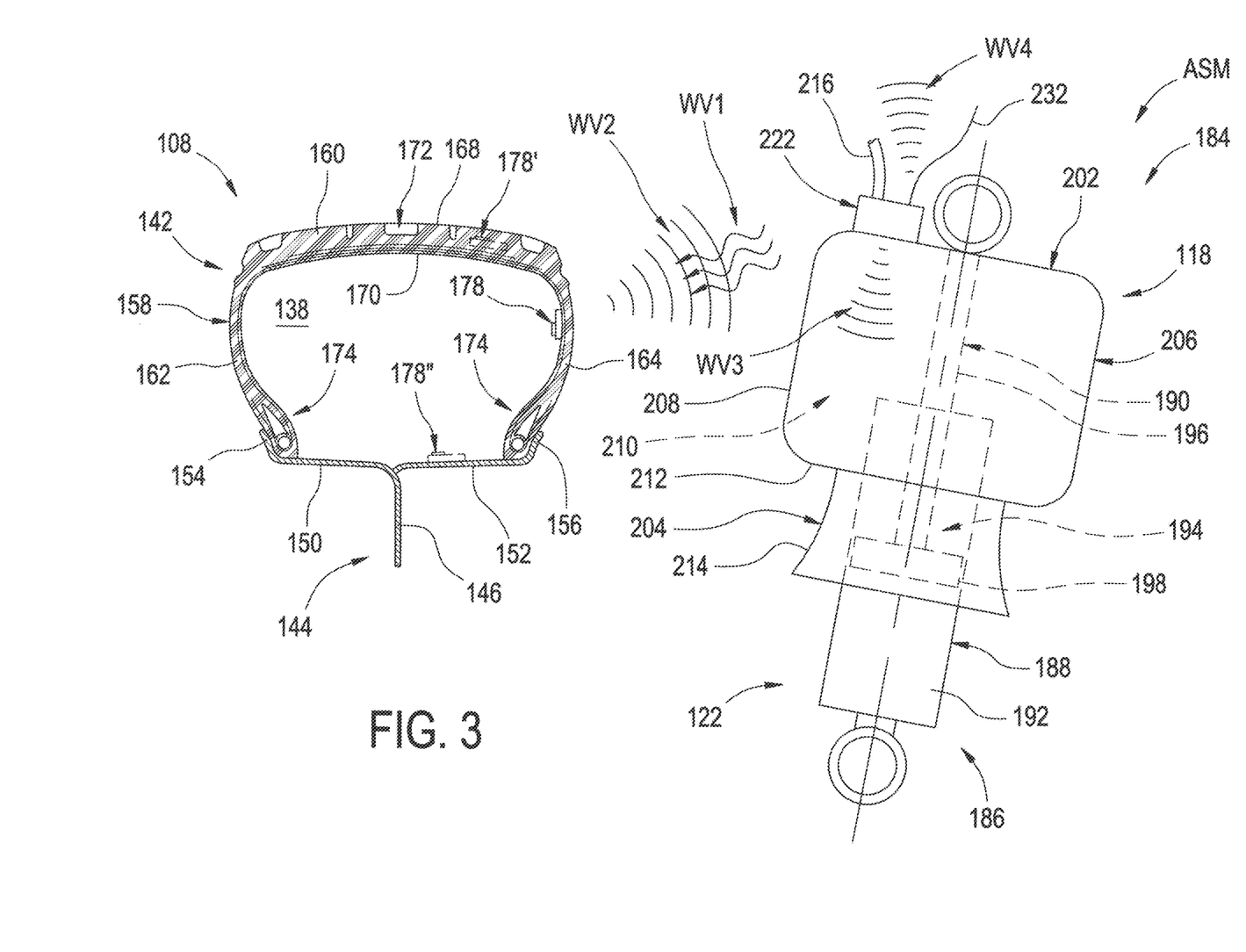
FIG. 3 is a cross-sectional side view of the tire taken from along line 3-3 in FIG. 2 shown in operative communication with a gas spring and damper assembly including a module in accordance with the subject matter of the present disclosure.

Tire 142 extends circumferentially about a wheel axis WAX (FIG. 2) and includes an elastomeric casing 158 that has a crown portion 160 and axially-spaced sidewalls 162 and 164 that extend radially inward from along crown portion 160. The crown portion includes an outer surface 168 and an inner surface 170 that at least partially defines tire chamber 138. One or more grooves 172 can, optionally, be provided along outer surface 168 of crown portion 160 in any desired pattern or configuration to form a tire tread, as is well known in the art.

Tire 142 can also include bead areas 174 (which, in some cases, may be alternately referred to as "mounting beads" or "mounting bead areas") that form the radially-inward extent of sidewalls 162 and 164. The bead areas are dimensioned or otherwise adapted to form an air-tight relationship along the bead seats (not numbered) in an installed condition of tire 142 on wheel 144. It will be appreciated that bead areas having a wide variety of combinations of shapes, sizes, features and elements have been developed and can be included on tire 142. Non-limiting examples of such features and elements include bead toe features, bead heel features, bead flippers, bead chippers, and chaffing strips. When mounted on a wheel, tire 142 can be inflated through one of control devices 136 that is operatively connected with tire chamber 138, such as through one of rim walls 150 and 152 of wheel 144, for example.

Control devices 136 can be disposed in fluid communication with a pressurized gas system in any manner suitable for selectively transferring pressurized gas into and out of tire chamber 138 of the wheel assemblies. For example, valve assembly 126 is shown in FIG. 1 as being in communication with control devices 136 through suitable gas transfer lines 176. As such, pressurized gas can be selectively transferred into and/or out of the tire chambers of tires 142 through valve assembly 126 by selectively operating control devices 136, such as to alter or maintain gas pressure within wheel assemblies 108, for example.

As discussed above, communication system 112 can include tire pressure monitoring functionality, such as may be similar to conventional tire pressure monitoring systems, for example, and/or tire inflation functionality, such as may be similar to conventional tire inflation systems, for example. In some cases, communication system 112 can include a one or more sensing devices, such as may be operative to measure, sense, determined or otherwise indicate a magnitude, state and/or other characteristic having a relation to one or more inputs or conditions associated with wheel assemblies 108. In some cases, the one or more sensing devices can be included as components on, in or of wheel assemblies 108 and/or tires 142 thereof. One example of a sensing device assembly 178 is graphically represented in FIGS. 1-4 as including one or more sensors or sensing devices 180. It will be appreciated that sensors 180 can be of any suitable type, kind and/or construction. As non-limiting examples, sensors 180 can include any one or more of relative position sensors, pressure sensors or transducers, temperature sensors or thermocouples, and/or accelerometers, including single-axis and/or multi-axis accelerometers. Additionally, it will be appreciated that sensing device assemblies 178 can be supported on or along wheel assemblies 108 in any suitable manner. As non-limiting examples, sensing device assemblies 178 can be supported on inner surface 170 of sidewall 164 of tire 142, such as is shown in FIG. 3, can be disposed within a portion of tire casing 158, such as is represented in FIG. 3 by sensing device assemblies 178', and/or can be supported on wheel or rim 144, such as is represented in FIG. 3 by sensing device assemblies 178".

In accordance with the subject matter of the present disclosure, sensing device assemblies 178, 178', 178" and/or sensing devices 180 thereof can, in some cases, be at least partially powered and/or otherwise charged by way of wireless power transmission. Additionally, or in the alternative, sensors 180 can, optionally, be powered by a local electrical power source 182, such as a battery, for example. In such cases, local electrical power source 182 can be rechargeable by way of way of wireless power transmission. In some cases, sensing device assemblies 178 and/or sensing devices 180 can be electrically operated by a combination of local electrical power and wirelessly transmitted power generation. As used herein, terms such as "wireless power transmission" and the like broadly refer to non-contact power transfer techniques and/or implementations, such as may utilize radiative and/or inductive coupling, for example. As more-specific, non-limiting examples, terms such as "wireless power transmission" and the like can refer to or otherwise include tightly-coupled electromagnetic inductive or non-radiative communications, loosely-coupled or radiative electromagnetic resonant communications and uncoupled radio frequency (RF) wireless communications.

Gas spring and damper assembly ASM has a longitudinally-extending axis AX and extends axially between opposing ends 184 and 186. Damper 122 and gas spring assembly 118 can be operatively secured to one another around and along axis AX. Damper assembly 122 is shown as including a damper housing 188 and a damper rod assembly 190 that is at least partially received in the damper housing. Damper housing 188 includes a housing wall 192 that at least partially defines a damping chamber 194. Damper rod assembly 190 includes an elongated damper rod 196 and a damper piston 198 disposed along one end of damper rod 196. Damper piston 198 is received within damping chamber 194 of damper housing 188 for reciprocal movement along the housing wall in a conventional manner. A quantity of damping fluid 200 can be disposed within damping chamber 194, and damper piston 198 can be displaced through the damping fluid to dissipate kinetic energy acting on gas spring and damper assembly ASM. Though damper assemblies 122 are shown and described herein as having a conventional construction in which a damping liquid may be contained within at least a portion of damping chamber 194, it will be recognized and appreciated that dampers of other types, kinds and/or constructions, such as pressurized gas or "air" dampers, for example, could be used without departing from the subject matter of the present disclosure.

Gas spring assembly 118 can include an end member 202, such as a top cap, bead plate or reservoir enclosure, for example. Gas spring assembly 118 can also include an end member 204, such as a roll-off piston or piston assembly, for example, that is disposed in axially-spaced relation to end member 202. A flexible spring member 206 extends axially between opposing ends (not numbered), and peripherally around longitudinal axis AX. Flexible spring member 206 can be operatively interconnected with components of the gas spring assembly and/or gas damper assembly in any suitable manner. For example, in some cases, one or both ends of the flexible spring member can, optionally, include a mounting bead or other connection feature, such as may include a reinforcing element (e.g., a bead wire) or other suitable component, for example. In other cases, the flexible spring member can take the form of an elongated sleeve with one or more cut ends along which the reinforcing cords of the flexible spring member are exposed.

In the exemplary arrangement shown in FIGS. 1 and 3, flexible spring member 206 includes a flexible wall 208 that extends axially between opposing ends, and can be operatively connected between end members 202 and 204 in a substantially fluid-tight manner such that a spring chamber 210 is at least partially defined therebetween. In some cases, a portion of flexible wall 208 can form a rolling lobe 212 that is displaced along an outer side surface portion 214 of end member 204 as gas spring and damper assembly ASM moves between extended (i.e., rebound) and compressed (i.e., jounce) conditions, as is well understood in the art.

It will be appreciated that end members 202 and 204 can be of any suitable type, kind, configuration and/or construction. Additionally, it will be appreciated that end members 202 and 204 can be formed from any suitable material or combination of materials. As non-limiting examples, such materials can include metal materials (e.g., steel and/or aluminum) and/or polymeric materials (e.g., such as: fiber-reinforced polypropylene; fiber-reinforced polyamide; unreinforced (i.e., relatively high modulus) polyester, polyethylene, polyamide and/or polyether) or any combination thereof. As such, it will be appreciated that end member 202 and 204 can include any suitable number or combination of walls and/or wall portions.

As indicated above, pressurized gas system 114 can be operatively associated with any one or more of wheel assemblies 108, gas spring assemblies 118 and/or other components and systems that consume, generate or otherwise fluidically communicate with pressurized gas (e.g., pressurized air). In such cases, pressurized gas system 114 can be utilized to selectively supply pressurized gas to and/or selectively transfer pressurized gas from any one or more of such assemblies, components and/or systems. For example, pressurized gas system 114 can be operatively associated with the gas spring assemblies for selectively supplying pressurized gas (e.g., air) thereto and/or selectively transferring pressurized gas therefrom. In the exemplary arrangement shown in FIG. 1, valve assembly 112 is shown as being in communication with gas spring assemblies 118 through suitable gas transfer lines 216. As such, pressurized gas can be selectively transferred into and/or out of the spring chamber of the one or more gas spring assemblies through valve assembly 112 by selectively operating valves 116, such as to alter or maintain vehicle height at one or more corners of the vehicle, for example.

In accordance with the subject matter of the present disclosure, communication system 112 can, in some cases, include one or more communication and power transmission modules 218 disposed toward predetermined areas, regions or zones (e.g., corners) of the vehicle, such as adjacent wheel assemblies 108 and non-fluid spring devices 116, for example. It will be appreciated that modules 218 can be supported on or along any suitable component and/or structure in any suitable manner, such as on or along vehicle body 102 and/or suspension components 104 and/or 106, for example. Modules 218 can be communicatively coupled in a wireless manner with one or more of an adjacent one of control device 136, rechargeable electrical power source 140, sensing device assembly 178, sensors 180 and/or local electrical power source 182, as is schematically represented in FIG. 1 by waves WV1 and WV2. Additionally, or in the alternative, modules 218 can be communicatively coupled (either through wired or, preferably, wireless transmissions) with a height or distance sensing device 220 disposed between the sprung and unsprung masses of the vehicle and capable of outputting or otherwise generating data, signals and/or other communications having a relation to a height of the non-fluid spring devices or a distance between other components of the vehicle.

Communication system 112 can, in some cases, include one or more communication and power transmission modules 222 that are disposed toward predetermined areas, regions or zones (e.g., corners) of the vehicle, such as adjacent wheel assemblies 108, gas spring devices 118 and/or dampers 122, for example. Modules 222 can be communicatively coupled in a wireless manner with one or more of an adjacent one of control device 136, rechargeable electrical power source 140, sensing device assembly 178, sensors 180 and/or local electrical power source 182. Additionally, modules 222 can include or otherwise be communicatively coupled with one or more sensing devices operatively associated with the performance and/or operation of gas spring assemblies 118 and/or dampers 122, such as are collectively schematically represented in FIGS. 1 and 3 by waves WV3. As non-limiting examples, such sensing devices can include any one or more of relative position sensors, pressure sensors or transducers, temperature sensors or thermocouples, accelerometers, including single-axis and/or multi-axis accelerometers, and/or control devices, such as may be operative to selectively alter the condition, performance and/or operation of gas spring assemblies 118 and/or dampers 122, for example.

Vehicle 100 can include a control system 224 that can be capable of communicating with one or more systems and/or components of vehicle 100, suspension system 110 and/or communication system 112, such as for selective operation and/or control of any systems, assemblies and/or devices thereof. In the arrangement shown in FIG. 1, control system 224 can include a controller or electronic control unit (ECU) 226 communicatively coupled with compressor 124 and/or valve assembly 126, such as through a conductor or lead 228, for example, for selective operation and control thereof, which can include supplying and exhausting pressurized gas to and/or from wheels 108, gas spring assemblies 118 and/or other systems, assemblies and/or devices of vehicle 100. It will be appreciated that controller 226 can be of any suitable type, kind and/or configuration.

Controller 226 of control system 224 can be communicatively coupled with modules 218 and/or 222 in a suitable manner. As one example, modules 218 and/or 222 could be communicatively coupled with controller 226 by way of conductors or leads 230 and 232, respectively, such as is shown in the arrangement in FIG. 1, for example. Additionally, or in the alternative, controller 226 could be communicatively coupled with modules 218 and/or 222 by way of wireless communications, such as are schematically represented in FIG. 1 by waves WV4. It is to be understood that waves WV4 are representative of electrical power and/or communication signals transferred to/from or otherwise exchanged by way of wireless power transmission and/or wireless communications, as have been described above in detail.

In the arrangements shown in FIGS. 1, 3-5 and 6, wireless data and/or signal communication and wireless power transmission are schematically represented by waves WV1 and WV2, such as have been described above. It will be recognized and appreciated that such representations are not intended to be limiting and that wireless data and/or signal communications and wireless power transmission can flow or otherwise transfer in either or both directions (i.e., to modules 218/222, from modules 218/222 and/or both to and from modules 218/222) without limitation. In the exemplary arrangement shown in FIG. 1, modules 218 can include a communication connection portion 234 adapted to be communicatively coupled with controller 226 wirelessly and/or by way of leads 230 and a sensor connection portion 236 communicatively coupled with communication connection portion 234 as well as one or more associated sensing devices, such as distance sensing device 220, for example. Modules 218 can also include a wireless power and communication portion 238 communicatively coupled with portions 234 and/or 236. In a preferred arrangement, wireless power and communication portion 238 can be adapted to be communicatively coupled in a wireless manner with one or more of control device 136, rechargeable electrical power source 140, sensing device assembly 178, sensors 180 and/or local electrical power source 182, as is schematically represented in FIG. 1 by waves WV1 and WV2.

Additionally, or in the alternative, modules 222 can include a communication connection portion 240 adapted to be communicatively coupled with controller 226 wirelessly and/or by way of leads 232 and a sensor connection portion 242 communicatively coupled with communication connection portion 240 as well as one or more associated sensing devices, such as one or more of the sensing devices collectively represented in FIGS. 1 and 3 by waves WV3, for example. In some cases, one of the one or more sensing devices can be operatively associated with the gas spring assemblies and capable of outputting or otherwise generating data, signals and/or other communications having a relation to a height of the gas spring assemblies or a distance between other components of the vehicle. It will be appreciated that such distance sensing devices can be of any suitable type, kind and/or construction, such as may include physically-connected components and/or non-contact constructions, such as those that operate using sound, pressure, light and/or electromagnetic waves, for example.

Modules 222 can include a gas connection portion 244 adapted for operative engagement with an associated pressurized gas line, such as one or more of gas transfer lines 216, for example. Modules 222 can further include a control device portion 246 that can include or can be otherwise operatively associated with a control device (e.g., a valve) adapted to selectively supply pressurized gas (e.g., air) to and/or selectively transfer pressurized gas from an associated gas spring assembly. As such, pressurized gas can be selectively transferred into and/or out of the spring chamber of the one or more gas spring assemblies through selective operation of control device portion 246, such as to alter or maintain vehicle height at one or more corners of the vehicle, for example.

Modules 222 can also include a wireless power and communication portion 248 communicatively coupled with portions 240, 242 and/or 246. In a preferred arrangement, wireless power and communication portion 248 can be adapted to be communicatively coupled in a wireless manner with one or more of control device 136, rechargeable electrical power source 140, sensing device assembly 178, sensors 180 and/or local electrical power source 182, as is schematically represented in FIG. 1 by waves WV1 and WV2. Any one or more of the modules shown and described herein can include a suitable module body or enclosure with one or more walls and/or wall portions, such as are schematically represented in FIGS. 1, 3, 5 and 6 by lines HSG.

Figure 4:
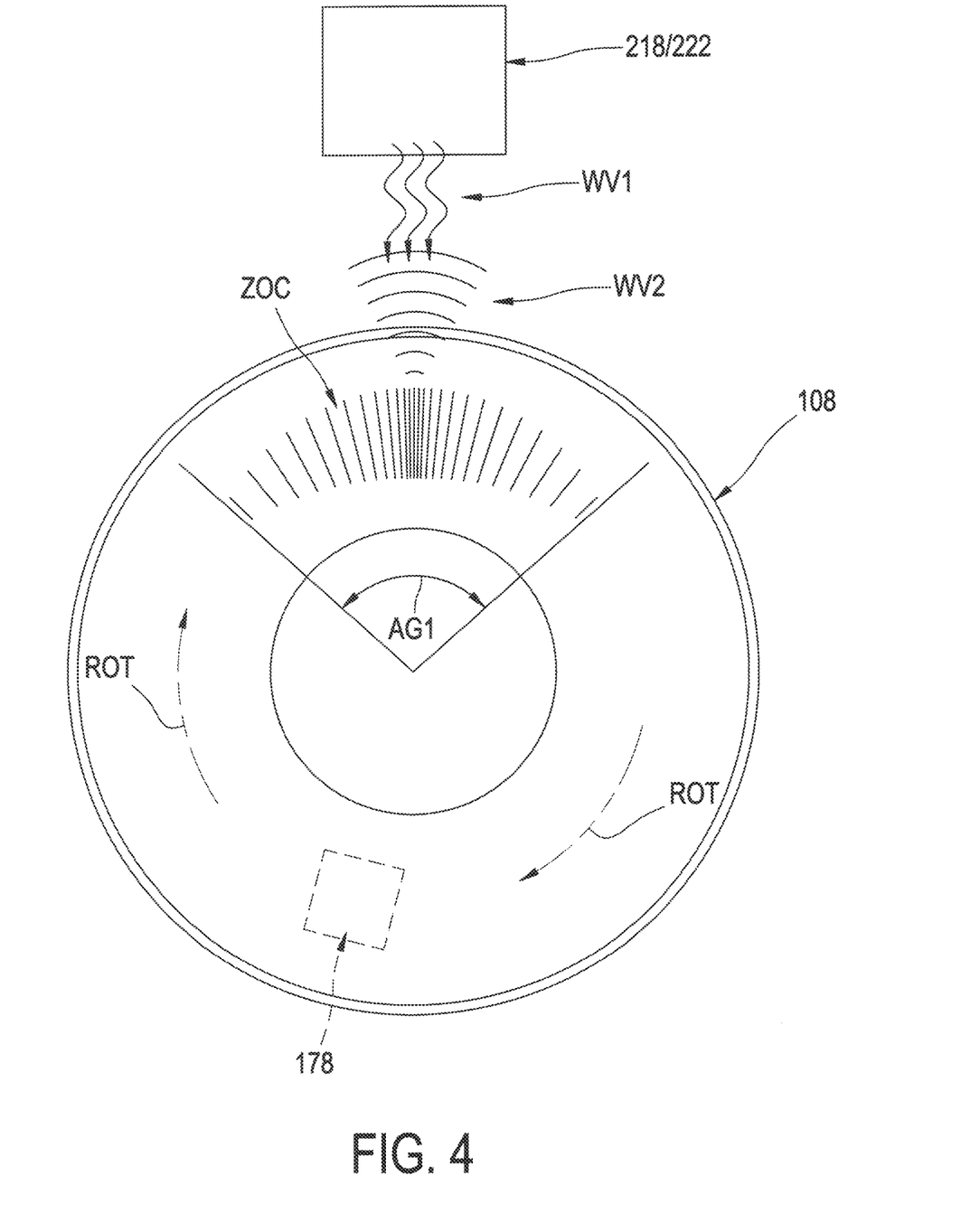
FIG. 4 is a graphical representation of a communication range of a rotating tire with respect to a stationary module in accordance with the subject matter of the present disclosure.

It will be appreciated that as wheel assemblies 108 rotate during use, sensing device assemblies 178 that are operatively associated therewith will move through a generally circular path, such as is represented in FIG. 4 by arrows ROT, for example. Additionally, it will be recognized and appreciated that modules 218 and/or 222 will be supported on or along non-rotating components and, thus, in a comparatively stationary position relative to sensing device assemblies 178. In some cases, modules 218 and/or 222 may be disposed in a generally central position relative to the rotational path of the sensing device assemblies. In such cases, the sensing device assemblies may be maintained at a relatively constant distance from modules 218 and/or 222. In other cases, however, modules 218 and/or 222 may be supported on a vehicle in an offset or otherwise non-central position relative to the circular motion of sensing device assemblies 178 and wheel axis of rotation WAX and/or a midline MDL (FIG. 3). It will be appreciated that any one or any combination of two or more offsets can be included, such as a vertical offset, which is schematically represented in FIGS. 2 and 4 by reference dimension OS1, a longitudinal offset, which is schematically represented in FIG. 3 by reference dimension OS2, and/or a lateral offset, which is schematically represented in FIG. 2 by reference dimension OS3.

In such cases, the distance between modules 218 and/or 222 and the sensing device assemblies will vary as the sensing device assemblies move through a rotational path, such as is represented in FIG. 4, for example. In such case, the strength of communication may vary with the distance between the modules and the rotating sensing device assemblies. In some cases, the distance between the modules and the rotating sensing device assemblies may be sufficient such that an angular zone of communication ZOC is formed, such as is represented in FIG. 4 by reference dimension AG1, for example. In such case, the strength of communication and/or power transfer between the modules and the rotating sensing device assemblies may be initially weak and continue to strengthen as the sensing devices move toward the associated modules and then begin to weaken as the sensing devices move away from the associated sensing modules. In some cases, angular zone of communication ZOC can extend through a full 360 degrees of rotation about wheel axis WAX. In other cases, the angular zone of communication can extend through a range of rotation that is less than a full 360 degrees. In such cases, angle AG1 can include a range of approximately 270 degrees of rotation or less. In still other cases, angular zone of communication ZOC can extend through a range of rotation with angle AG1 being approximately 180 degrees or less. In further cases, the angular zone of communication can extend through a range of rotation with angle AG1 being approximately 90 degrees or less.

In the arrangement shown in FIG. 1, vehicle 100 can include a supervisory control unit SCU that is communicatively coupled with controller 226 of control system 224 in a suitable manner. It will be appreciated that controller 226 can be communicatively coupled with supervisory control unit SCU in any suitable manner, such as by way of a wired or wireless connection. For example, in the arrangement shown in FIG. 1, controller 226 is communicatively coupled with supervisory controller SCU by way of a conductor or lead 250, for example, that may, in some cases, be communicatively coupled with a vehicle network and/or other systems and/or components.

In the arrangement shown in FIG. 1, modules 218 and/or 222 are individually communicatively coupled with controller 226, such as through leads 230 and/or 232, for example. Alternately, modules 218 and/or 222 can be individually communicatively coupled with controller 226 by way of wireless communications, such as is schematically represented in FIG. 1 by waves WV4, for example. In such an arrangement, communication and control to and from multiple sensors and/or devices at or near a given corner of vehicle 100 can be transmitted through one of modules 218 and/or 222 to controller 226. In some cases, such communication and/or control can be processed, coordinated or otherwise handled by a suitable combination of controller 226 and/or supervisory control unity SCU.

Figure 5:
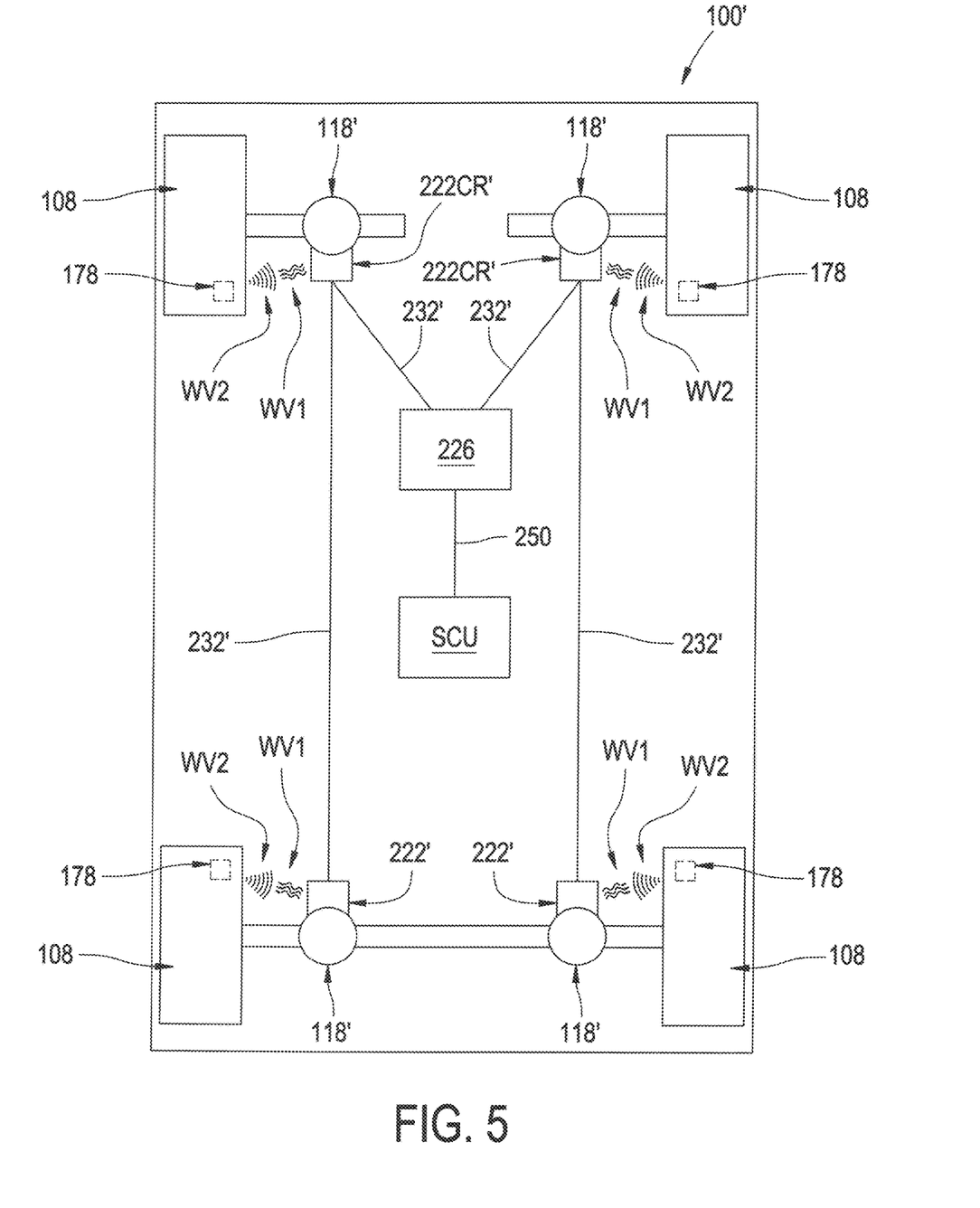
FIG. 5 is a schematic representation of a vehicle including an alternate arrangement of communication modules in accordance with the subject matter of the present disclosure.

An alternate arrangement of communicative coupling of communication and power transmission modules, such as one or more of modules 218 and/or 222, for example, is shown in FIG. 5 in which vehicle 100' includes gas spring assemblies 118' disposed adjacent wheel assemblies 108. Vehicle 100' includes communication and power transmission modules 222' that are operatively associated with gas spring assemblies 118' and communicatively coupled with sensing device assemblies 178 by way of waves WV1 and/or WV2, such as has been described in detail above. The arrangement in FIG. 5 differs from the configuration in FIG. 1 at least in that vehicle 100' in FIG. 5 includes one or more coordinating communication and power transmission modules 222CR' in addition to modules 222'. As shown in FIG. 5, modules 222CR' are communicatively disposed in series between at least one of modules 222' and controller 226. It will be appreciated that communicative coupling can be implemented through any suitable combination of wireless (e.g., waves WV4 in FIGS. 1 and 3) and/or wired (e.g., conductors or leads 232') techniques, such as have been described above in detail. In some cases, modules 222CR' can simply pass communications, data, signals and/or other information to, from and/or otherwise between modules 222' and controller 226. In other cases, modules 222CR' can analyze, compare, encode, decode, combine and/or otherwise process communications, data, signals and/or other information to, from and/or otherwise between modules 222' and controller 226 prior to forwarding or otherwise communicating data, signals and/or other information or instructions to, from and/or otherwise between modules 222', controller 226 and/or other components and/or systems of the vehicle.

Figure 6:
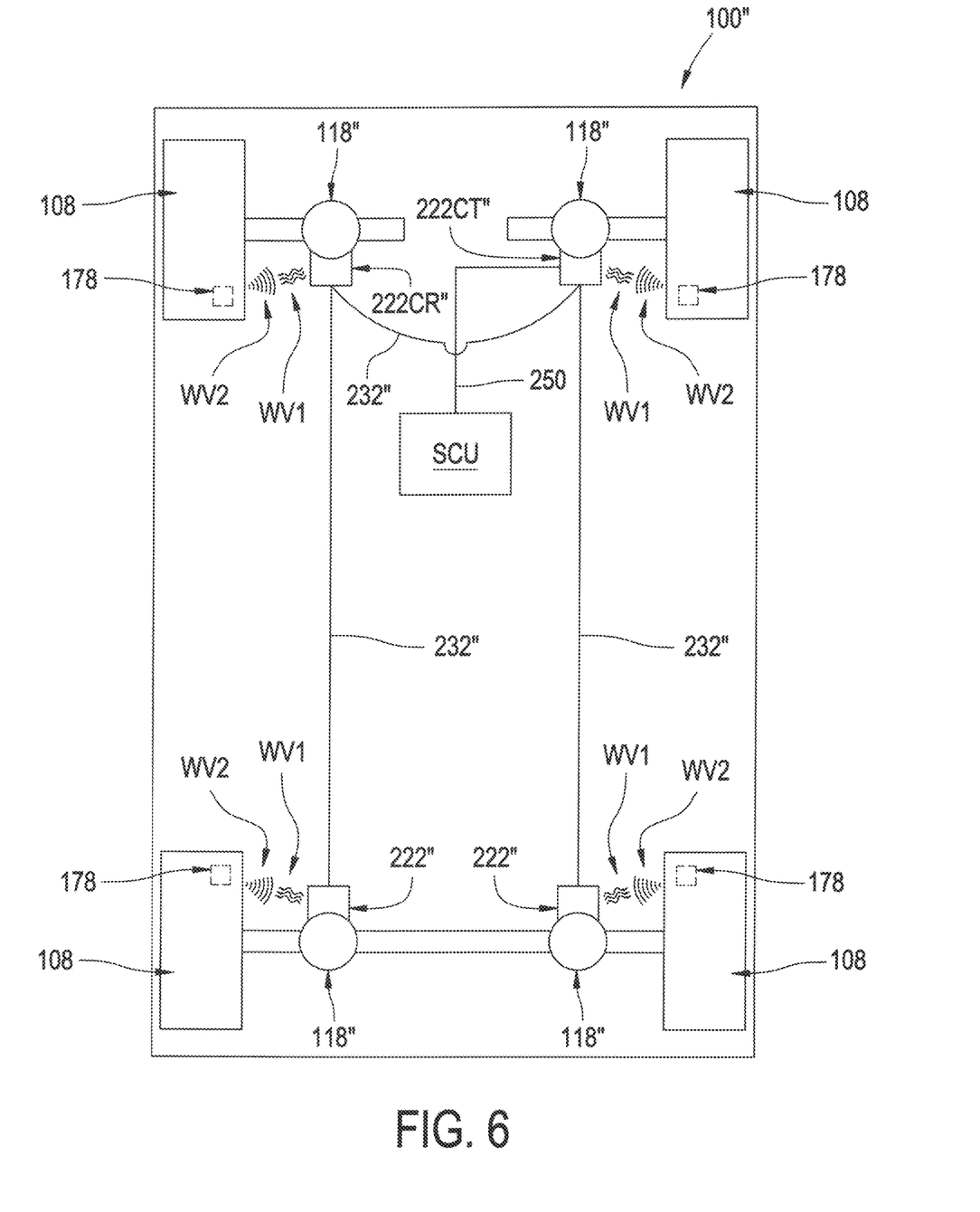
FIG. 6 is a schematic representation of a vehicle including another alternate arrangement of communication modules in accordance with the subject matter of the present disclosure.

Another alternate arrangement of communicative coupling of communication and power transmission modules, such as one or more of modules 218 and/or 222, for example, is shown in FIG. 6 in which vehicle 100" includes gas spring assemblies 118" disposed adjacent wheel assemblies 108. Vehicle 100" includes communication and power transmission modules 222" that are operatively associated with gas spring assemblies 118" and communicatively coupled with sensing device assemblies 178 by way of waves WV1 and/or WV2, such as has been described in detail above. The arrangement in FIG. 6 differs from the configuration in FIGS. 1 and 5 at least in that vehicle 100" in FIG. 6 includes one or more coordinating communication and power transmission modules 222CR" as well as a controlling communication and power transmission module 222CT" in addition to modules 222". Similar to the arrangement in FIG. 5, modules 222CR" are communicatively disposed in series between at least one of modules 222" and a controller. However, in the arrangement shown in FIG. 6, controlling module 222CT" can include cumulative operable functionality of modules 222", 222CR" and controller 226, such as have been described above. As such, controller 226 is omitted from the arrangement in FIG. 6 with the functionality conventionally associated therewith included in controlling module 222CT". Accordingly, controlling module 222CT" is communicatively coupled with modules 222", 222CR" and supervisory control unit SCU. It will be appreciated that modules 222", 222CR" and 222CT" as well as supervisory control unit SCU can be communicatively coupled by way of any combination of wireless (e.g., waves WV4 in FIGS. 1 and 3) and/or wired (e.g., conductors or leads 232") transmissions, such as have been discussed above in detail.

It will be appreciated that any one or more of the modules shown and described herein (e.g., modules 218, 222, 222', 222CR', 222CR" and/or 222CT") can include a suitable module body or enclosure with one or more walls and/or wall portions, such as are schematically represented in FIGS. 3 and 4 by lines HSG. It will be appreciated that any sensing device assemblies 178 can also include a suitable body or enclosure with one or more walls and/or wall portions, such as are schematically represented in FIGS. 3 and 4 by lines BDY.

In accordance with the subject matter of the present disclosure, any one or more of the foregoing arrangements shown and described herein can include one or more of a pressurized gas connection, an electrical communication/power connection as well as a height sensor and/or one or more additional sensors. As an advancement over known constructions, additional electronic components can be included as a part of the connected corner assembly that are communicatively coupled with non-suspension system components, such that the connected corner assembly can operate as a communication hub for non-suspension system components, such as tire and/or brake system components.

As one example, a connected corner assembly in accordance with the subject matter of the present disclosure could include a transmitter and/or receiver communicatively coupled with a tire-pressure monitoring system and/or a tire inflation system. Each tire could include a pressure sensor that wirelessly communicates with a corresponding transmitter/receiver included as a component of the connected corner. Conventional TPMS/TIS sensors are usually battery operated. As an improvement, the connected corner transmitter could wirelessly power the TPMS/TIS sensors (or possibly other components of a TPMS/TIS or other systems). Such power transfer could be used to operate a sensor or other component. Additionally, or in the alternative, such power transfer could be used to charge the battery of a sensor or other device such that a smaller, less expensive battery could be used.

The external powering of in-tire devices addresses a long time issue of how to operate such internal devices without large batteries. In addition to providing communication, the subject matter of the present disclosure can aid in or even assume the role of energizing such devices, which may mean that smaller batteries or even no batteries may be needed within the tire. Such an arrangement could reduce complexity, weight and/or provide longer service life to tires. Additionally, with this potential, more content can be put into the tire, such as edge analytics that will now be able to monitor the health of the product as an enabler to predict the component coming to the end of its useful life.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring assembly dimensioned for securement to an associated vehicle component adjacent an associated wheel that has an associated sensing device operatively associated therewith, said gas spring assembly comprising:
    a flexible spring member having a longitudinal axis, said flexible spring member extending lengthwise between opposing first and second ends and peripherally about said longitudinal axis to at least partially define a spring chamber;
    a first end member secured across said first end of said flexible spring member such that a substantially fluid-tight seal is formed therebetween;
    a second end member secured across said second end of said flexible spring member such that a substantially fluid-tight seal is formed therebetween;
    a gas spring sensing device adapted to communicate outputs having a relation to a property of said gas spring assembly; and,
    a communication and power transmission module supported on one of said first and second end members, said module including:
        a communication connection portion communicative coupled with an associated controller by way of one of a wireless connection and a wired connection that includes at least one electrical conductor;
        a sensor connection portion communicatively coupled with said gas spring sensing device; and,
        a wireless power and communication portion adapted for communicative coupling with the associated sensing device of the associated wheel, said wireless power and communication portion operable to communicate wireless data and/or signals to and/or from the associated sensing device of the associated wheel and operable to wirelessly transmit power to the associated sensing device of the associated wheel.

2. A gas spring assembly according to claim 1, wherein said gas spring sensing device is operable to sense distance, temperature, pressure and/or acceleration.

3. A gas spring assembly according to claim 1, wherein said communication and power transmission module includes a control device portion communicatively coupled with said communication connection portion.

4. A gas spring assembly according to claim 3 further comprising a control device communicatively coupled with said control device portion.

5. A gas spring assembly dimensioned for securement to an associated vehicle component adjacent an associated wheel that has an associated axis of rotation and an associated sensing device operatively associated therewith, said gas spring assembly comprising:
    a flexible spring member having a longitudinal axis, said flexible spring member extending lengthwise between opposing first and second ends and peripherally about said longitudinal axis to at least partially define a spring chamber;
    a first end member secured across said first end of said flexible spring member such that a substantially fluid-tight seal is formed therebetween;
    a second end member secured across said second end of said flexible spring member such that a substantially fluid-tight seal is formed therebetween;
    a gas spring sensing device adapted to communicate outputs having a relation to a property of said gas spring assembly; and,
    a communication and power transmission module supported on one of said first and second end members, said module including:
        a communication connection portion adapted for communicative coupling with an associated controller;
        a sensor connection portion communicatively coupled with said gas spring sensing device; and,
        a wireless power and communication portion adapted for communicative coupling with the associated sensing device of the associated wheel with at least said wireless power and communication portion is positioned within a zone of communication of the associated sensing device as the associated wheel undergoes rotation about the associated axis of rotation such that said wireless power and communication portion is operable to communicate wireless data and/or signals to and/or from the associated sensing device of the associated wheel and operable to wirelessly transmit power to the associated sensing device of the associated wheel.

6. A gas spring assembly according to claim 5, wherein said zone of communication is less than approximately 270 degrees of a full rotation of the associated wheel about the associated axis of rotation.

7. A gas spring assembly according to claim 5, wherein a strength of wireless communication between said wireless power and communication portion and the associated sensing device varies across said zone of communication.

8. A gas spring assembly according to claim 5, wherein a strength of power transfer between said wireless power and communication portion and the associated sensing device varies across said zone of communication.

9. A gas spring assembly according to claim 5, wherein said gas spring sensing device is operable to sense distance, temperature, pressure and/or acceleration.

10. A gas spring assembly according to claim 5, wherein said communication and power transmission module includes a control device portion communicatively coupled with said communication connection portion.

11. A vehicle comprising:
a first sensing device operatively associated with a wheel and operable to communicate outputs having a relation to a property of said wheel; and,
a gas spring assembly supported on a vehicle component adjacent said wheel, said gas spring assembly having a longitudinal axis and including:
a flexible spring member having a longitudinal axis, said flexible spring member extending lengthwise between opposing first and second ends and peripherally about said longitudinal axis to at least partially define a spring chamber;
a first end member secured across said first end of said flexible spring member such that a substantially fluid-tight seal is formed therebetween;
a second end member secured across said second end of said flexible spring member such that a substantially fluid-tight seal is formed therebetween;
a gas spring sensing device adapted to communicate outputs having a relation to a property of said gas spring assembly; and,
a communication and power transmission module supported on one of said first and second end members, said module including:
a communication connection portion adapted for communicative coupling with a controller;
a sensor connection portion communicatively coupled with at least said gas spring sensor; and,
a wireless power and communication portion adapted for communicative coupling with said first sensing device, said wireless power and communication portion operable to communicate wireless data and/or signals to and/or from said first sensing device of said wheel and operable to wirelessly transmit power to said first sensing device of said wheel.

12. A vehicle according to claim 11 further comprising a second sensing device operatively associated with a vehicle component and/or a suspension component, said second sensing device communicatively coupled with said communication connection portion of said communication and power transmission module and operative to communicate outputs having a relation distance, temperature, pressure and/or acceleration.

13. A vehicle according to claim 12, wherein said communication and power transmission module includes a sensor connection portion communicatively coupled with said second sensing device.

14. A vehicle according to claim 11, wherein said communication and power transmission module is at least partially supported on one of said first and second end members.

15. A vehicle according to claim 11, wherein said wheel includes a rim and an elastomeric tire supported on said rim.

16. A vehicle according to claim 15, wherein said first sensing device is supported on said rim, supported on said elastomeric tire, or at least partially embedded within said elastomeric tire.

17. A vehicle according to claim 15, wherein said elastomeric tire is a pneumatic tire that includes a tire chamber and forms a substantially fluid-tight seal along said rim.

18. A vehicle according to claim 11, wherein said first sensing device includes a plurality of sensors.

19. A vehicle according to claim 11, wherein said first sensing device includes a power source.

20. A gas spring assembly according to claim 1, wherein the associated wheel has an associated axis of rotation and at least said wireless power and communication portion is positioned within a zone of communication of the associated sensing device as the associated wheel undergoes rotation about the associated axis of rotation.

* * * * *